US011067178B1

(12) United States Patent
Harrel et al.

(10) Patent No.: US 11,067,178 B1
(45) Date of Patent: Jul. 20, 2021

(54) MULTI-TAPER PLUG VALVE

(71) Applicant: Quarter Turn Pressure Control, LLC, Midland, TX (US)

(72) Inventors: Travis Harrel, Midland, TX (US); Christian Leuchtenberg, Singapore (SG); Glen H. Cuiper, Haddon Township, NJ (US)

(73) Assignee: Quarter Tum Pressure Control, LLC, Midland, TX (US)

( * ) Notice: Subject to any disclaimer, the term of this patent is extended or adjusted under 35 U.S.C. 154(b) by 0 days.

(21) Appl. No.: 16/514,895

(22) Filed: Jul. 17, 2019

Related U.S. Application Data

(60) Provisional application No. 62/699,641, filed on Jul. 17, 2018.

(51) Int. Cl.
*F16K 5/04* (2006.01)
*F16K 5/18* (2006.01)

(52) U.S. Cl.
CPC .......... *F16K 5/0407* (2013.01); *F16K 5/0464* (2013.01); *F16K 5/0471* (2013.01); *F16K 5/0478* (2013.01); *F16K 5/184* (2013.01)

(58) Field of Classification Search
CPC ...... F16K 5/0207; F16K 5/025; F16K 5/0274; F16K 5/0278; F16K 5/182; F16K 5/185; F16K 5/0407; F16K 5/045; F16K 5/0471; F16K 5/0478; F16K 5/161; F16K 5/162; F16K 5/165; F16K 5/166; F16K 5/202; F16K 5/204
See application file for complete search history.

(56) References Cited

U.S. PATENT DOCUMENTS

| | | | | |
|---|---|---|---|---|
| 2,228,190 | A | * | 1/1941 | Waddell ................. F16K 5/0271 251/159 |
| 3,133,722 | A | * | 5/1964 | McGuire ................. F16K 5/0271 251/309 |
| 7,204,474 | B2 | | 4/2007 | McGuire et al. |
| 7,451,959 | B2 | | 11/2008 | Matzner |
| 7,946,558 | B2 | | 5/2011 | McGuire et al. |
| 8,800,663 | B2 | | 8/2014 | Long |
| 2019/0346064 | A1 | * | 11/2019 | Nowell ................. F16K 5/0471 |

FOREIGN PATENT DOCUMENTS

| | | | | |
|---|---|---|---|---|
| DE | 3246622 A1 | * | 7/1984 | ........... F16K 27/065 |
| FR | 993169 A | * | 10/1951 | ............. F16K 5/167 |

* cited by examiner

*Primary Examiner* — Hailey K. Do (57) ABSTRACT

A high pressure plug valve includes a valve body having an annular inner surface with a taper having a first taper direction and an annular body saver having an outer surface with a taper having a second taper direction opposite the first taper direction. The outer surface of the annular body saver adapted to interface with the annular inner surface of the valve body with a tapered interference fit.

20 Claims, 7 Drawing Sheets

MULTI-TAPER PLUG VALVE

CROSS-REFERENCE TO RELATED APPLICATION AND CLAIM OF PRIORITY

The present application claims priority under 35 U.S.C. § 119(e) to U.S. Provisional Patent Application No. 62/699,641 filed Jul. 17, 2018, which is incorporated herein by reference in its entirety for all purposes.

FIELD OF INVENTION

This invention relates in general to fluid drilling equipment and in particular to high pressure valves subjected to severe operating conditions, such as the high pressures, high flow rates, and abrasive fluids commonly found in hydraulic fracturing operations and other oil and gas drilling applications.

BACKGROUND OF INVENTION

Plug valves have a service life that is limited by the condition of the main body. Internal parts can be replaced, but eventually the deterioration of the sealing insert to main body interface, due to corrosion, wear, erosion and eventual washout, leads to an unusable main body. A damaged main body typically must be repaired in an intrusive manner, such as welding. The root cause of this deterioration is the inherent design of plug valves, which include small gaps between the internal sealing parts that allow movement of the main sealing interface (i.e. the rotation of a plug between the inserts). Without these gaps, the plug will lock-up due to friction. The tolerances of these gaps are affected by the temperature and/or pressure inside the valve.

In one of the most severe service applications known today, hydraulic fracturing ("fracing"), very high pressure slurry is pumped through the plug valves at very high rates. The fracing slurry is then forced down a wellbore with enough pressure to fracture the hydrocarbon bearing rock formations and force particulates into the resulting cracks. When the pressure is released, the particles ("proppant"), which may be sand or other high compressive strength additives, such as ceramic particles and bauxite, remain in the fractures (cracks) and keep the fractures open. This "mechanism" then allows pathways for hydrocarbons to flow from the rock that was previously solid. The particle size in facing fluids is distributed such that the larger particles can prop open larger cracks and finer particles can prop open the very tips of the cracks, which are microscopic in nature. The particle sizes can vary from 0.004 inches to 0.01 inches (No 140 Mesh to No 8 Mesh). The pumping pressure at the valve can be up to 15,000 psi and the slurry velocity through a valve bore of 5.125 inches, as is typical of a 5⅛ inch, 15000 psi valve, is well above the erosional velocity of about 50 to 70 feet per second. Moreover, fracing is typically preceded and followed by an acid wash of 15% hydrochloric acid, which accelerates corrosion.

As one skilled in the art of mechanical engineering can ascertain, the fracing "mechanism" will inject proppant particles into any crack, orifice or possible leak path in the valve assembly. The injected particles then remain in the valve assembly when the pressure is released. Small particles as large as 0.004 inches are within machining tolerances of steel parts and therefore will find their way into metal sealing surfaces. With the high velocity of abrasive fracing fluid, any weakness or point of turbulence can very quickly lead to a washout of a seal area or any interface. If an area or interface adjoins the valve main body, then the life of the main valve body is severely limited.

To preserve the main moving sealing parts and to allow them to seal effectively, very high viscosity sealing greases are injected into the plug valves as many times as practicable on a job. Greasing forces the proppant out of the interfaces to allow effective sealing and prevent scouring of the seal surfaces with trapped particles. Even with this procedure, the moving sealing faces have a very limited service life and are replaced frequently.

Today, with higher pressures and higher frac flowrates being used in fracing, larger valves are being constructed directly from higher strength steels like 4340 and 17-4PH steel. These steels are difficult and time intensive to weld repair, and therefore a cost effective and simple method is required to preserve the main deterioration points of the valves.

SUMMARY OF INVENTION

On exemplary embodiment of the principles of the present invention is a high pressure plug valve, which includes a valve body having an annular inner surface with a taper having a first taper direction and an annular body saver having an outer surface with a taper having a second taper direction opposite the first taper direction. The outer surface of the annular body saver is adapted to interface with the annular inner surface of the valve body with a tapered interference fit.

Another exemplary embodiment of the present principles is a plug assembly for a high pressure plug valve, which includes a valve plug having sealing surfaces and a flow bore. A plug saver having a flow bore is adapted to receive the valve plug for covering the sealing surfaces of the valve plug such that the flow bore of the valve plug and the flow bore of the plug saver are rigidly aligned.

A further representative embodiment of the inventive principles is a body saver insert for use with a plug valve having a valve body with an annular inner surface with a taper of a first taper direction. The body saver insert includes an annular body having an outer surface with a taper of a second taper direction opposite the first taper direction, the outer surface of the annular body is adapted to interface with the annular inner surface of the valve body with a tapered interference fit.

The embodiments of the present inventive principles advantageously use interfering tapers, which allows for part replacement without resort to invasive repair techniques such as welding. Consequently, the life of a high-pressure plug valve can be extended while minimizing cost, personnel time, and equipment downtime. In addition, embodiments of these principles extend plug and insert life by protecting surfaces from the harsh environments encountered during fracing operations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The problems being solved and the solutions provided by the embodiments of the principles of the present inventions are best understood by referring to FIGS. 1 to 7 of the drawings, in which like numbers designate like parts.

Figure 1:
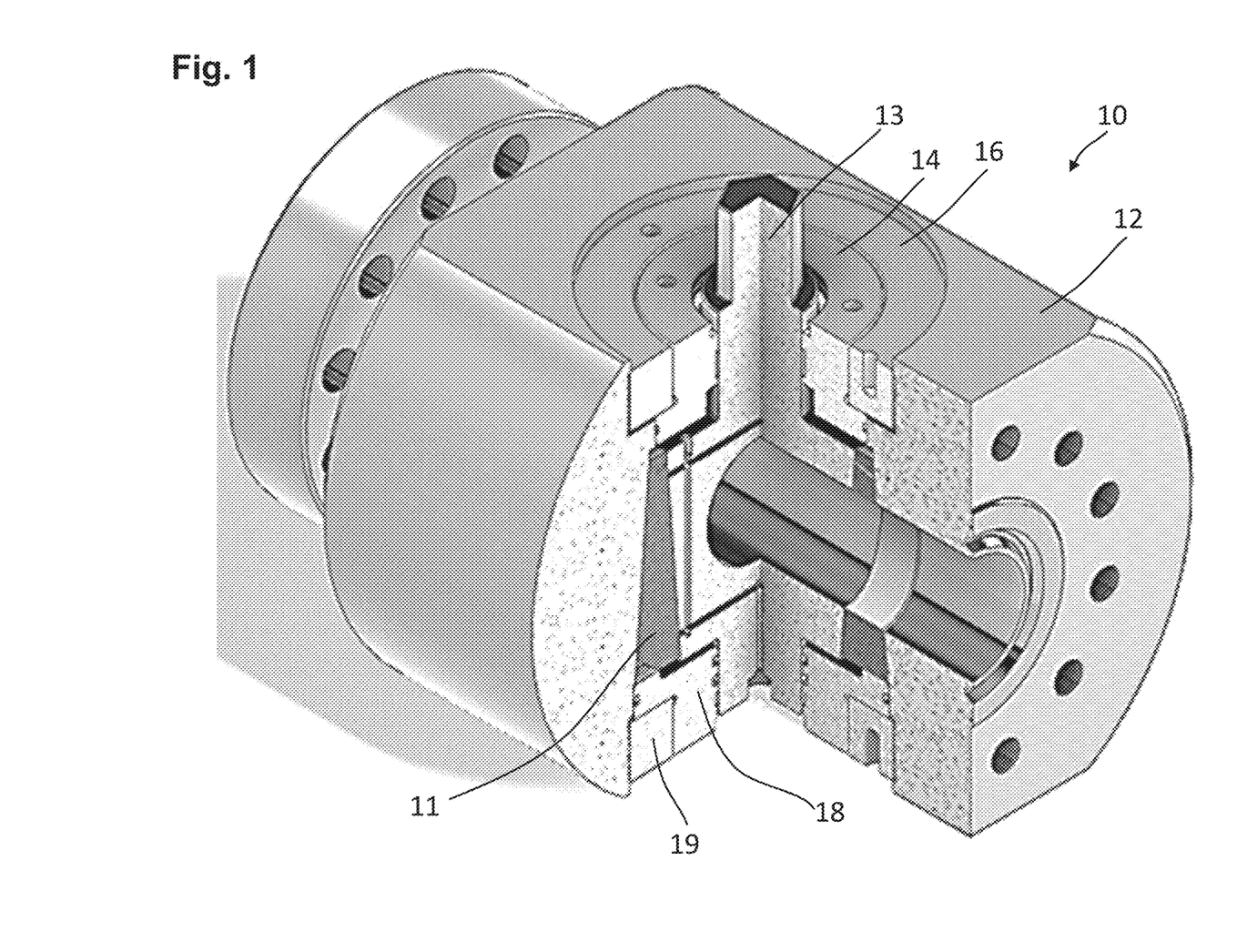
FIG. 1 is a schematic isometric view with a quarter cut-out of a plug valve according to one embodiment of the present invention.

FIG. 1 is a schematic isometric view with a quarter cut-out of a plug valve 10, according to the present invention. In the embodiment of FIG. 1, plug valve 10 has a double taper design. Advantageously, both the insert 11 and the plug 13 have tapers in opposing directions, i.e., the insert tapers from radially narrower at the top to radially wider at the bottom, whereas the plug tapers from radially wider at the top to radially narrower at the bottom, whereby the interfacing surfaces of the insert and plug have the same taper profile as seen in FIG. 1. The insert 11 is installed in the valve body 12 and preloaded by application of force to the sealing cap 18 by torqueing a nut 19. This secures the seal of the insert 11 to the valve body 12. Then, the tapered plug 13 is inserted, which in turn is loaded with a cap 14 by torqueing a nut 16. This gives an optimally adjustable interference fit between the plug 13, the insert 11 and the valve body 12 of the plug valve 10. The outside of insert 11 is cylindrical and the valve cavity of plug valve 10 is also cylindrical.

Figure 2:
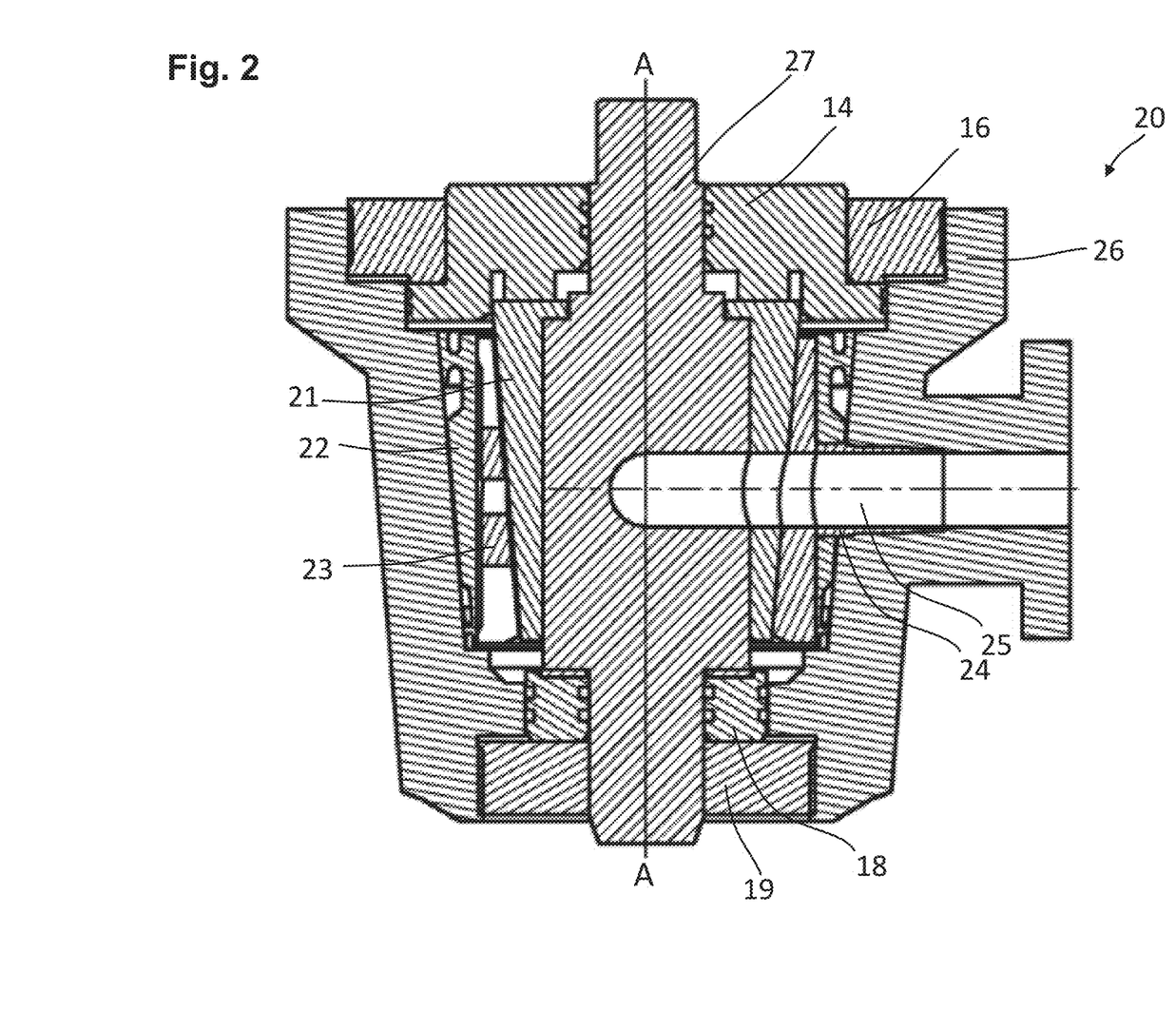
FIG. 2 is schematic side cross-sectional view of another plug valve with multiple tapers according to the present invention.

FIG. 2 is a schematic side cross-sectional view of another plug valve 20 with multiple tapers according to the present invention. The cross section is 90 degrees to the main cross section rotated on axis A-A. One particular feature is a tapered body saver with a metallic sealing installed in the tapered main body cavity of the plug valve 20. The embodiment of FIG. 2 includes a tapered insert 23 and a tapered sleeve 21 attached to a cylindrical plug 27 to give a similar double taper interference fit as depicted in FIG. 1 for plug valve 10. The plug valve 20 has an internally tapered body 26 and similar caps and nuts as plug valve 10, as designated by the like numbers. The tapered valve body 26 has a tapered body saver insert 22 installed in the main valve cavity. The tapered body saver insert 22 is sealed to the valve flow bore 25 with two further sealing bore inserts 24 (only one shown). When the body saver insert 22 is installed, a cylindrical internal valve cavity is created into which a tapered insert 23 is placed. A sleeve 21 with an external taper is located on the plug 27, which in turn gives an adjustable interference fit with the tapered insert 23.

Figure 3:
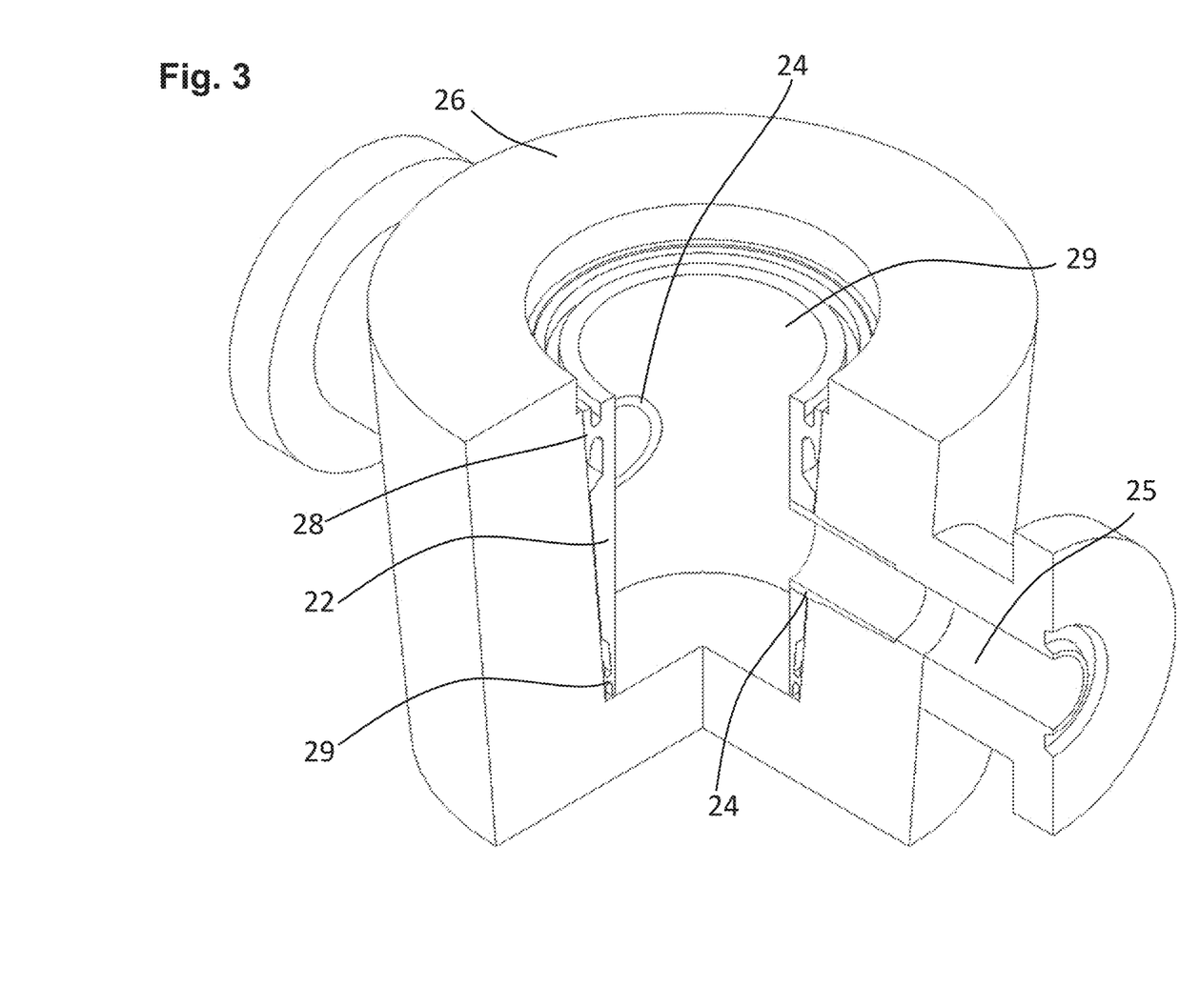
FIG. 3 is a schematic isometric view with a quarter cut-out of the body of a plug valve embodying the present invention.

FIG. 3 is a schematic isometric view of the body of the plug valve 20 from FIG. 2 with a quarter cut-out. Here, the tapered body saver insert 22 and two bore inserts 24 are shown. The inserts 24 are of preferably the same design as disclosed in copending and co-assigned U.S. nonprovisional patent application Ser. No. 16/008,970, filed Jun. 14, 2018, and entitled Replaceable Body Saver, which is incorporated herein by reference for all purposes.

Thus, the combination of body saver insert 22 and replaceable inserts 24 gives the valve body 26 a cylindrical bore 29 similar to the valve in FIG. 1. The sealing of the body saver insert 22 to the valve body 26 is achieved by a designed metallic interference fit achieved circumferentially by flexible t-shaped outward-extending projections at 28 and 29 forming flexible circumferential seals.

Figure 4:
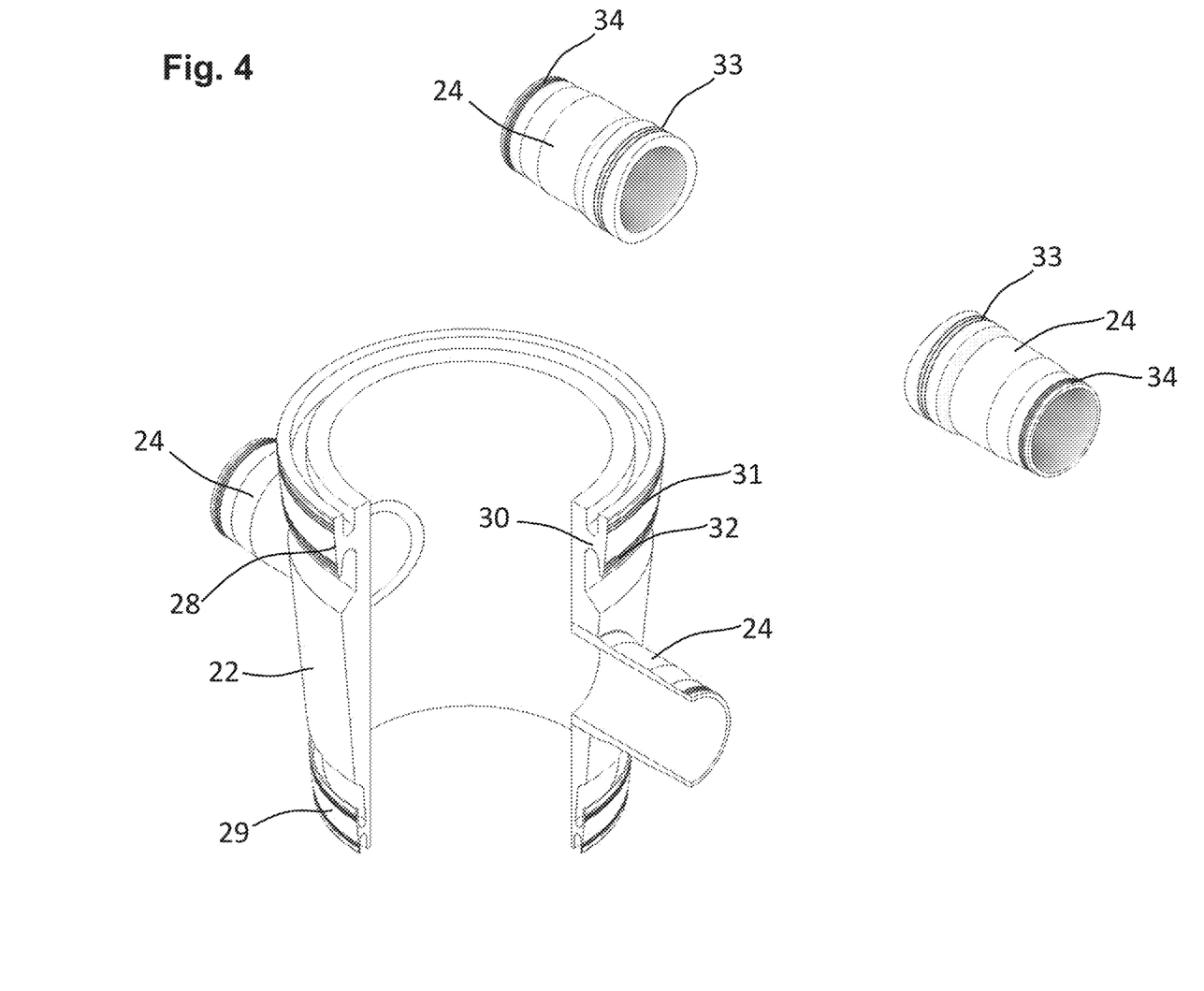
FIG. 4 is a schematic isometric view with a quarter cut-out of the body saver of a plug valve according to an embodiment of the present invention.

FIG. 4 is a schematic isometric view with a quarter cut-out of the body saver insert 22, as described in FIGS. 2 and 3 earlier. FIG. 4 shows duplicate bore inserts 24 for clarity. The bore inserts 24 seal to body saver insert 22 with seals 33 (elastomeric, metallic or a combination thereof) and to the main valve flow bore 25 with seals 34 (elastomeric, metallic, or a combination thereof). Advantageously, the body saver insert 22 uses flexible metal interference sealing achieved by having the circumferential seals 28 and 29 each comprise a thin metal bridge 30 that connects the sealing points 31 and 32 on the radially outer portion of the t-shape seals to the main portion of the body saver insert and allows the sealing points 31 and 32 to slightly flex thus ensuring a good metal to metal seal at circumferential seal 28 to the valve body. The same design is used for the lower circumferential seal point 29.

Figure 5:
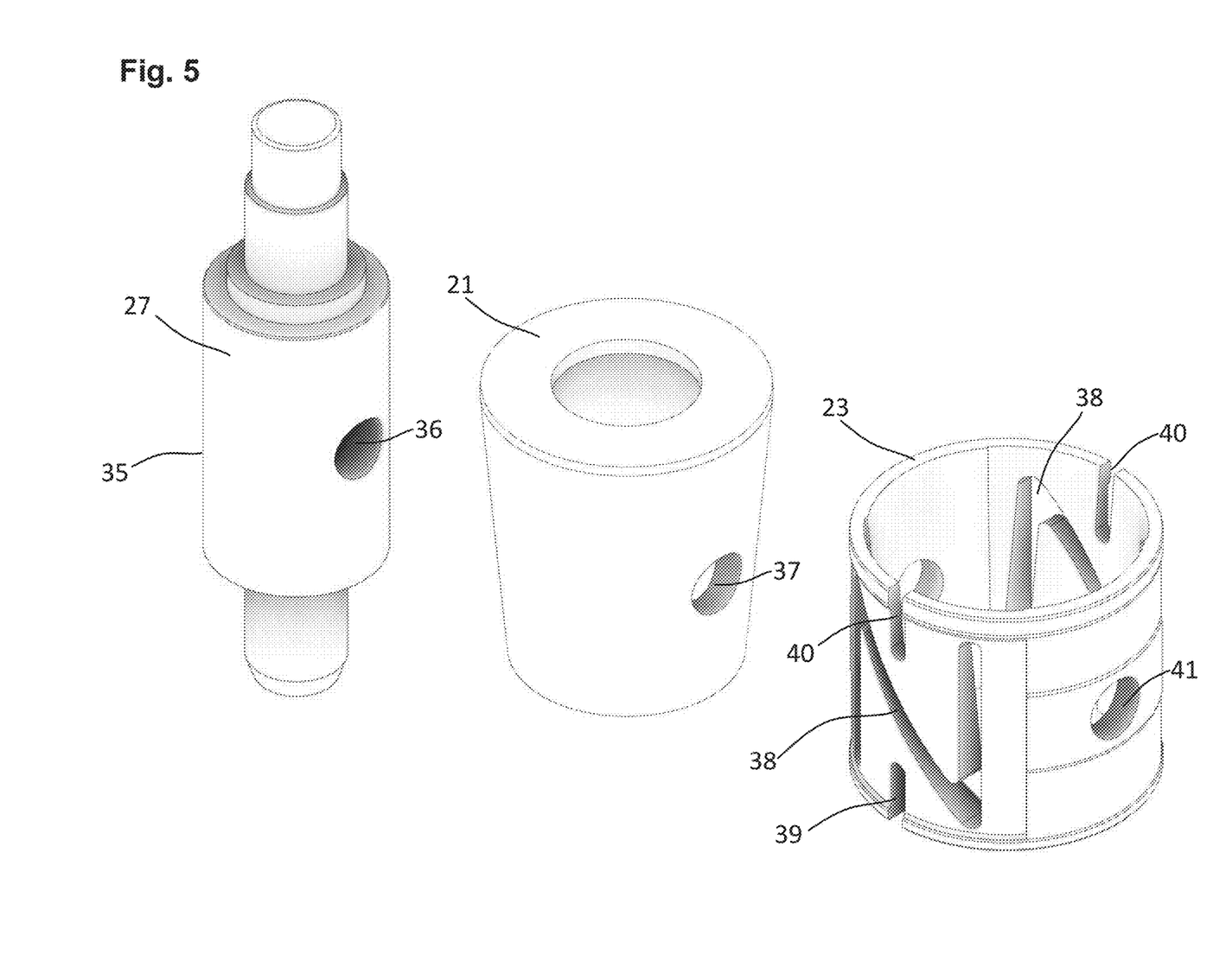
FIG. 5 is a schematic isometric view of the internals of a plug valve embodying the present invention.

FIG. 5 is a schematic isometric view of the internals of the plug valve 20, as described in the FIGS. 2 to 4. The plug 27 has a cylindrical external face 35. The sleeve 21 slides over the plug 27 and has an internal cylindrical bore that interference fits sealingly with the plug 27 (no seals shown). The sleeve 21 is locked to the plug 27 (details shown in later figures) such that the bores 36 and 37 align. The sleeve 21 is tapered from top to bottom with the top being wider. The sleeve 21 fits into a sealing insert 23 that has an opposing internal taper wider on bottom and narrower at the top. The sealing insert 23 is cylindrical on the outside diameter and has two Z-slots 38 cut into opposing sides at 90 degrees to the bore 41, as well as two slots 40 in the top circumference of sleeve at 90 degrees to the bore 41. Further, two slots 39 (only one shown) are cut also at exactly 90 degrees to the bore 41. This innovation allows the sealing insert 23 to flex preferentially in the same axis as the bore.

Figures 6A, 6B, 6C:
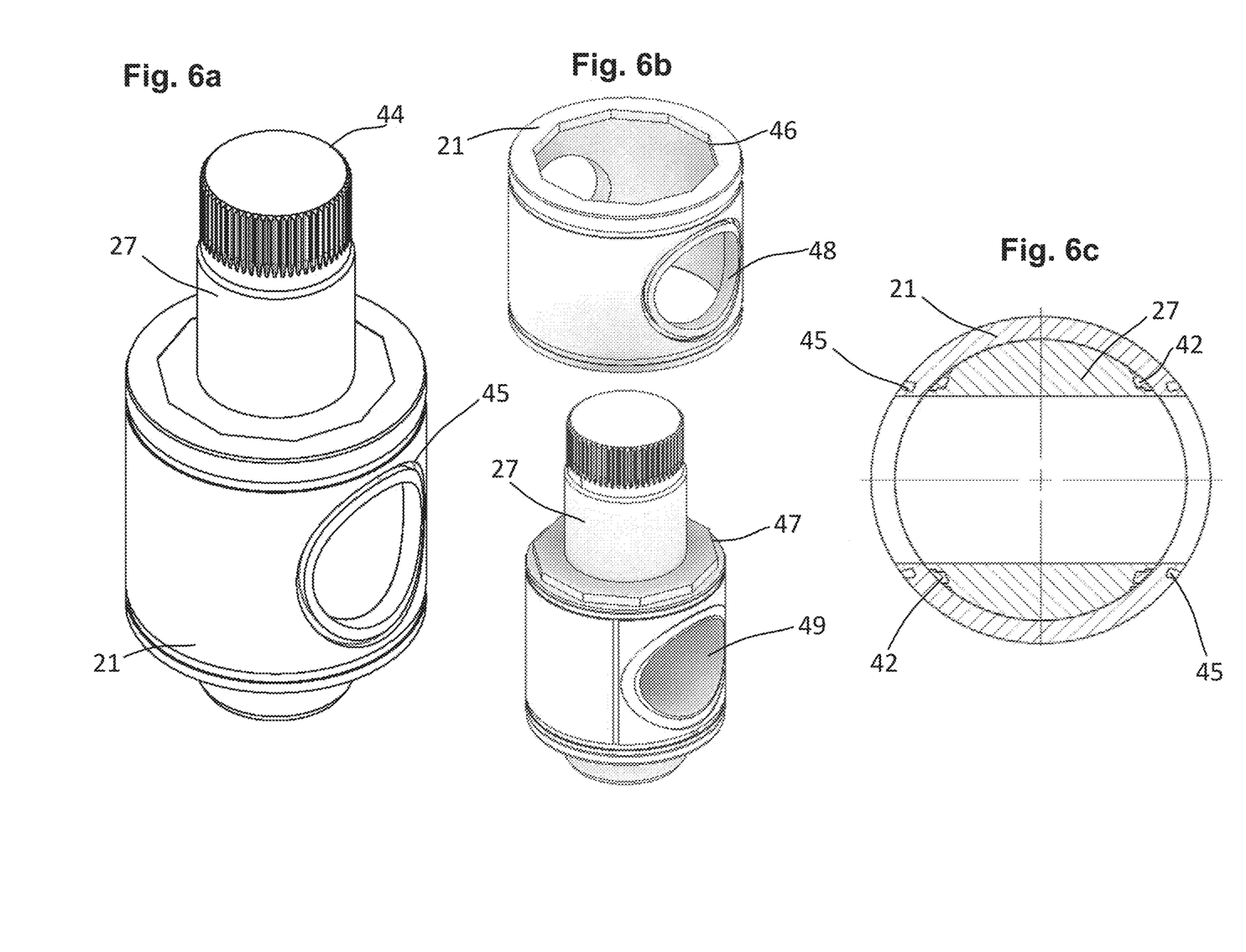
FIG. 6A is a schematic isometric view of an assembled plug and sleeve according to the present invention.
FIG. 6B is an exploded view of an assembled plug and sleeve according to the present inventions.
FIG. 6C is a transverse cross-section of the assembly of FIG. 6A.

FIG. 6A is a schematic isometric view of an assembled plug 27 and sleeve 21. The plug 27 has a spline 44 machined on to it that will directly fit an actuator. FIG. 6B is an exploded view, which shows the sleeve 21 interlocked with the plug 27 with matching octagonal fits 46 and 47 which ensure that the two parts are rigidly connected with the bores 48 and 49 aligned. FIG. 6C is a transverse cross-section of assembly illustrated in FIG. 6A that shows grooves 45 on exterior of sleeve to receive seals or transport grease. FIG. 6C also shows the internal seals 42.

Figure 7:
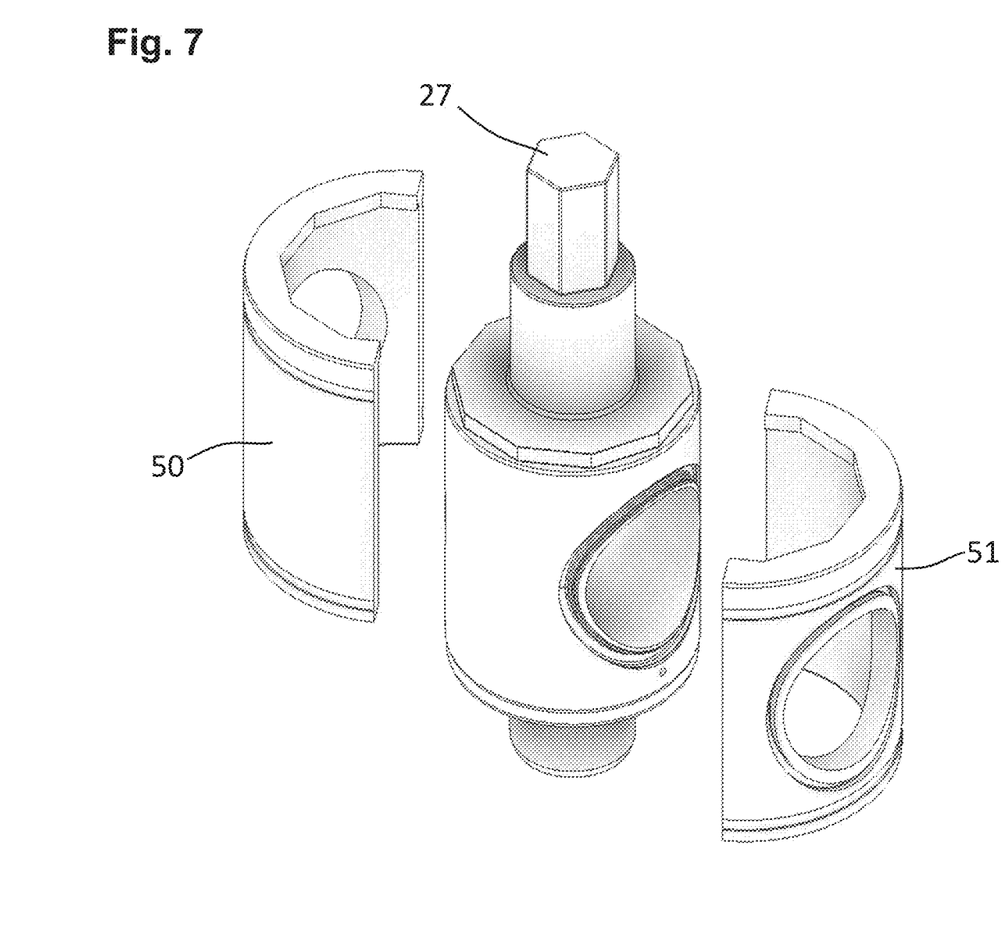
FIG. 7 is a multiple-part plug sleeve suitable for use with the valve plug of FIGS. 6A-6C.

FIG. 7 is another solution for sleeving the plug 27 by splitting the sleeve into two parts 50 and 51.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A high pressure plug valve comprising:
   a valve body having an annular inner surface facing towards a central axis, the inner surface of the valve body having a first taper relative to the central axis; and
   an annular body saver insert having an annular outer surface facing away from the central axis, the outer surface of the body saver insert having a second taper relative to the central axis, the outer surface of the annular body saver insert adapted to interface with the annular inner surface of the valve body with a tapered interference fit;
   wherein the body saver insert includes a main portion and a t-shaped projection extending from the main portion in a direction away from the central axis; and
   wherein the t-shaped projection includes a bridge connected on a radially inner end to the main portion of the body saver insert and connected on a radially outer end to a circumferential seal disposed circumferentially around the central axis, an outer surface of the circumferential seal defining at least part of the outer surface of the body saver insert; and
   wherein, when viewed in cross section along a plane through the central axis, the bridge has a first width measured in a direction parallel to the central axis and the circumferential seal has a second width measured in a direction parallel to the central axis, the second width of the circumferential seal being greater than the first width of the bridge.

2. The high pressure plug valve of claim 1, further comprising a plug having a tapered outer surface adapted to interface with a tapered inner surface of the annular body saver with a tapered interference fit.

3. The high pressure plug valve of claim 1, wherein the bridge connecting the circumferential seal to the main portion of the body saver insert can slightly flex to provide flexible metal interference sealing between the circumferential seal and the valve body.

4. The high pressure plug valve of claim 1, wherein the outer surface of the annular body saver and the annular inner surface of the valve body provide a metal-to-metal tapered interference fit.

5. The high pressure plug valve of claim 1, wherein the annular body saver is inserted into a first end of a cavity defined by the valve body and further comprising a first cap and a first nut for retaining the annular body saver insert within the cavity.

6. The high pressure plug valve of claim 5, further comprising:
   a plug is inserted into an opposing second end of the cavity defined by the valve body, and
   a second cap and a second nut for retaining the plug within the cavity.

7. The high pressure plug valve of claim 1, further comprising:
   a valve plug including sealing surfaces and a flow bore; and
   a plug saver having a flow bore and adapted to receive the valve plug for covering the sealing surfaces of the valve plug such that the flow bore of the valve plug and the flow bore of the plug saver are aligned.

8. The high pressure plug valve of claim 7, further comprising grooves on an outer surface of the valve plug for receiving grease.

9. The high pressure plug valve of claim 7, further comprising at least one seal disposed on an outer surface of the plug saver for sealing contact with an outer surface of the valve plug.

10. The high pressure plug valve of claim 7, wherein the plug saver comprises a plurality of separable parts.

11. The high pressure plug valve of claim 7, wherein the plug saver is adapted to slide over the valve plug and is retained by a pattern of opposing interfering surfaces on the valve plug and plug saver.

12. The high pressure plug valve of claim 11, wherein the pattern of opposing interfering surfaces comprises a polygon.

13. A high pressure plug valve comprising:
   a valve body having an annular inner surface facing towards a central axis, the inner surface of the valve body having a first taper relative to the central axis; and
   an annular body saver insert having an annular outer surface facing away from the central axis, the outer surface of the body saver insert having a second taper relative to the central axis, the outer surface of the annular body saver insert adapted to interface with the annular inner surface of the valve body with a tapered interference fit;
   a plug disposed on the central axis;
   an annular sleeve having an annular inner surface facing toward the central axis for receiving the plug and having an annular outer surface facing away from the central axis, the annular outer surface being tapered relative to the central axis; and
   a tapered insert having an annular inner surface facing toward the central axis, the annular inner surface of the tapered insert being tapered relative to the central axis for providing an interference fit with the tapered outer surface of the annular sleeve and having an outer surface facing away from the central axis for interfacing with an inner surface of the annular body saver insert, the inner surface of the annular body insert saver facing toward the central axis.

14. The high pressure plug valve of claim 13, wherein the annular body saver insert includes a flow aperture adapted for alignment with a flow bore of the valve body and further comprising a bore insert having a first seal adapted to be received within the flow aperture of the annular body saver insert and a second seal adapted to be received within the flow bore of the valve body.

15. The high pressure plug valve of claim 13, wherein the annular sleeve comprises a pair of Z-shaped slots cut entirely through a sidewall of the annular sleeve on opposing sides and at ninety degrees to a flow bore of the valve body; and
   wherein each Z-shaped slot comprises a continuous slot having a first vertical oriented slot portion connected to a first end of a diagonal oriented slot portion and a second vertical oriented slot portion connected to a second end of the diagonal oriented slot portion.

16. The high pressure plug valve of claim 13, wherein the annular sleeve comprises a plurality of separable parts.

17. A body saver insert for use with a plug valve having a valve body with an annular inner surface facing towards a central axis, the inner surface of the valve body having a first taper relative to the central axis, the body saver insert comprising:

an annular body having an annular outer surface facing away from the central axis, the outer surface of the annular body having a second taper relative to the central axis, the outer surface of the annular body adapted to interface with the annular inner surface of the valve body with a tapered interference fit;

wherein the annular body includes a main portion and a t-shaped projection extending from the main portion in a direction away from the central axis; and wherein the t-shaped projection includes a bridge connected on a radially inner end to the main portion of the annular body and connected on a radially outer end to a circumferential seal disposed circumferentially around the central axis, the outer portion of the circumferential seal defining at least part of the outer surface of the annular body; and wherein, when viewed in cross section along a plane through the central axis, the bridge has a first width measured in a direction parallel to the central axis and the circumferential seal has a second width measured in a direction parallel to the central axis, the second width of the circumferential seal being greater than the first width of the bridge.

18. The body saver insert of claim 17, wherein the outer surface of the annular body of the body saver is adapted to create a metal-to-metal tapered interference fit with the annular inner surface of the valve body.

19. The body saver insert of claim 17, wherein the annular body includes a flow aperture adapted for alignment with a flow bore of the valve body.

20. The body saver insert of claim 17, wherein the bridge connecting the circumferential seal to the main portion of the annular body can slightly flex to provide flexible metal interference sealing between the circumferential seal and the valve body.

* * * * *